(12) United States Patent
Kim et al.

(10) Patent No.: US 10,623,028 B2
(45) Date of Patent: Apr. 14, 2020

(54) ANTENNA SYSTEM FOR COMMUNICATING IN PLURALITY OF FREQUENCY BANDS AND ELECTRONIC DEVICE INCLUDING ANTENNA SYSTEM

(71) Applicant: SAMSUNG ELECTRONICS CO., LTD., Suwon-si, Gyeonngi-do (KR)

(72) Inventors: Hyun Soo Kim, Seoul (KR); Hyo Seok Na, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/483,485

(22) PCT Filed: Jan. 31, 2018

(86) PCT No.: PCT/KR2018/001343
§ 371 (c)(1),
(2) Date: Aug. 5, 2019

(87) PCT Pub. No.: WO2018/147590
PCT Pub. Date: Aug. 16, 2018

(65) Prior Publication Data
US 2020/0021317 A1 Jan. 16, 2020

(30) Foreign Application Priority Data

Feb. 8, 2017 (KR) .................... 10-2017-0017736

(51) Int. Cl.
*H04B 1/44* (2006.01)
*H04B 1/00* (2006.01)
(Continued)

(52) U.S. Cl.
CPC ............... *H04B 1/006* (2013.01); *H01Q 1/38* (2013.01); *H01Q 1/48* (2013.01); *H01Q 5/335* (2015.01)

(58) Field of Classification Search
CPC . H04B 1/006; H04B 1/44; H04B 1/40; H01Q 5/357; H01Q 5/335; H01Q 5/48; H01Q 5/50; H01Q 5/312; H01Q 5/328
See application file for complete search history.

(56) References Cited

U.S. PATENT DOCUMENTS 5,867,127 A * 2/1999 Black .................... H01Q 1/244
343/702
8,923,914 B2 12/2014 Kim et al.
(Continued)

FOREIGN PATENT DOCUMENTS

KR 10-0664216 1/2007
KR 10-2011-0123995 11/2011
(Continued)

OTHER PUBLICATIONS

International Search Report for PCT/KR2018/001343 dated May 21, 2018, 4 pages.
(Continued)

*Primary Examiner* — Tuan Pham
(74) *Attorney, Agent, or Firm* — Nixon & Vanderhye, P.C.

(57) ABSTRACT

According to various embodiments of the present invention, an antenna system comprises: an antenna including a first radiator element operating in a first frequency band and a second radiator element operating in a second frequency band; a power supply part connected to the antenna; a first grounding part and a second grounding part; a matching circuit connected to the first grounding part; and a switch, wherein the switch can connect the first radiator element to the second grounding part and connect the second radiator element to the matching circuit when the antenna transmits or receives a signal through the first frequency band, and can connect the second radiator element to the second grounding part and connect the first radiator element to the matching
(Continued)

circuit when the antenna transmits or receives the signal through the second frequency band.

15 Claims, 11 Drawing Sheets

(51) Int. Cl.
  *H01Q 1/38* (2006.01)
  *H01Q 1/48* (2006.01)
  *H01Q 5/335* (2015.01)

(56) References Cited

U.S. PATENT DOCUMENTS

| | | | |
|---|---|---|---|
| 9,397,399 B2 | 7/2016 | Pajona et al. | |
| 9,472,848 B2* | 10/2016 | Pajona | H01Q 7/00 |
| 9,887,461 B2 | 2/2018 | Kim et al. | |
| 2011/0275333 A1 | 11/2011 | Kim et al. | |
| 2014/0354508 A1* | 12/2014 | Lee | H01Q 1/48 |
| | | | 343/860 |
| 2014/0370825 A1 | 12/2014 | Kim et al. | |
| 2015/0109175 A1 | 4/2015 | Kim et al. | |
| 2016/0254590 A1 | 9/2016 | Seo et al. | |

FOREIGN PATENT DOCUMENTS

| | | |
|---|---|---|
| KR | 10-2013-0077362 | 7/2013 |
| KR | 10-1490156 | 2/2015 |
| KR | 10-2016-0084745 | 7/2016 |
| KR | 10-2016-0105244 | 9/2016 |

OTHER PUBLICATIONS

Written Opinion of the ISA for PCT/KR2018/001343 dated May 21, 2018, 7 pages.

* cited by examiner

ANTENNA SYSTEM FOR COMMUNICATING IN PLURALITY OF FREQUENCY BANDS AND ELECTRONIC DEVICE INCLUDING ANTENNA SYSTEM

This application is the U.S. national phase of International Application No. PCT/KR2018/001343 filed Jan. 31, 2018 which designated the U.S. and claims priority to KR Patent Application No. 10-2017-0017736 filed Feb. 8, 2017, the entire contents of each of which are hereby incorporated by reference.

TECHNICAL FIELD

The disclosure relates an antenna system that operates in a plurality of frequency bands and an electronic device including the antenna system.

BACKGROUND ART

With the development of electronic technologies, various types of electronic devices are being developed and supplied. In particular, portable electronic devices such as a smartphone, a notebook PC, a tablet PC, a wearable device, and the like are widely supplied.

Electronic devices that are being recently launched support a wireless communication technology for the purpose of providing various services. Because a frequency band to be used varies depending on a kind of wireless communication technology, an electronic device may include a multi-band antenna for supporting a plurality of wireless communication technologies.

DISCLOSURE

Technical Problem

Radiated spurious emission that is used to measure the performance of an antenna is a test associated with a noise frequency component other than an operating frequency band.

Linearity of elements connected with the antenna may have to be secured for the performance of the antenna when the antenna operates in a specific frequency band. When the elements connected with the antenna operate non-linearly, a noise frequency component other than an operating frequency band may increase, and an RSE characteristic of the antenna may become problematic.

Various embodiments of the disclosure are to provide an antenna system capable of improving an RSE characteristic of an antenna by restricting a non-linear operation of a switch included in a multi-band antenna system and an electronic device including the antenna system.

Technical Solution

According to various embodiment of the disclosure, an antenna system may include an antenna that includes a first radiator element operating in a first frequency band and a second radiator element operating in a second frequency band, a feeder unit that is connected to the antenna, a first ground unit, a second ground unit, a matching circuit that is connected to the first ground unit, and a switch. The switch may connect the first radiator element with the second ground unit and connect the second radiator element with the matching circuit, when the antenna transmits or receives a signal through the first frequency band, and may connect the second radiator element with the second ground unit and connect the first radiator element with the matching circuit, when the antenna transmits or receives a signal through the second frequency band.

According to various embodiment of the disclosure, an electronic device may include a housing, a printed circuit board that is disposed within the housing and includes a ground region, and a wireless communication circuit that is disposed within the housing. The printed circuit board may include an antenna including a first radiator element operating in a first frequency band and a second radiator element operating in a second frequency band, wherein the first radiator element and the second radiator element, a first ground unit that is connected with the ground region, a second ground unit that is connected with the ground region, a matching circuit that is connected with the first ground unit, and a switch. The wireless communication circuit may allow the switch to connect the first radiator element with the second ground unit and connect the second radiator element with the matching circuit, when a signal is transmitted or received through the first frequency band, and to connect the second radiator element with the second ground unit and connect the first radiator element with the matching circuit, when a signal is transmitted or received through the second frequency band.

According to various embodiment of the disclosure, an antenna system may include an antenna that includes a plurality of radiator elements operating in different frequency bands, a feeder unit that is connected with the antenna, a first ground unit, a second ground unit, a switch, and a matching circuit that is interposed between the switch and the first ground unit. The switch may connect one of the plurality of radiator elements with the second ground unit and may connect the others of the plurality of radiator elements with the matching circuit.

Advantageous Effects

According to various embodiments of the disclosure, in an antenna including a switch to switch an operating frequency band, the degradation of an RSE performance of the antenna may be prevented by maintaining a voltage applied to the switch at a maximum allowable voltage or lower.

MODE FOR INVENTION

Figure 1A:
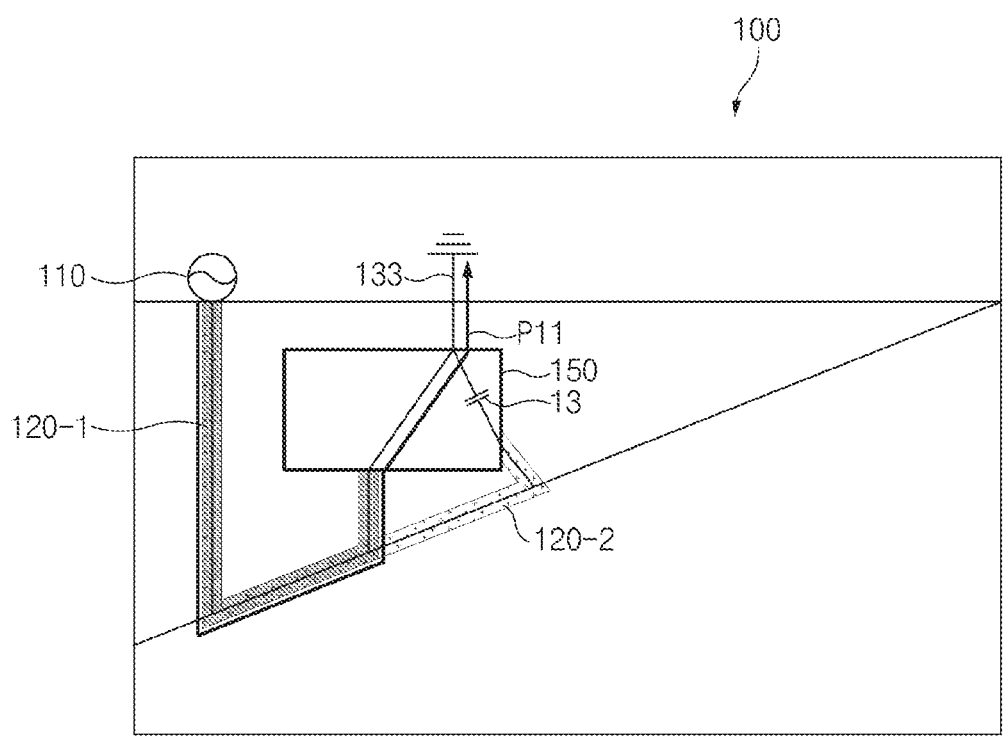
FIGS. 1A and 1B illustrate an example of an operation of an antenna system including a switching circuit.

Hereinafter, various embodiments of the disclosure may be described with reference to accompanying drawings.

Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various components regardless of the order and/or the priority and to distinguish the relevant components from other components, but do not limit the components. When an component (e.g., a first component) is referred to as being "(operatively or communicatively) coupled with/to" or "connected to" another component (e.g., a second component), the component may be directly coupled with/to or connected to the other component or an intervening component (e.g., a third component) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

Figure 1B:
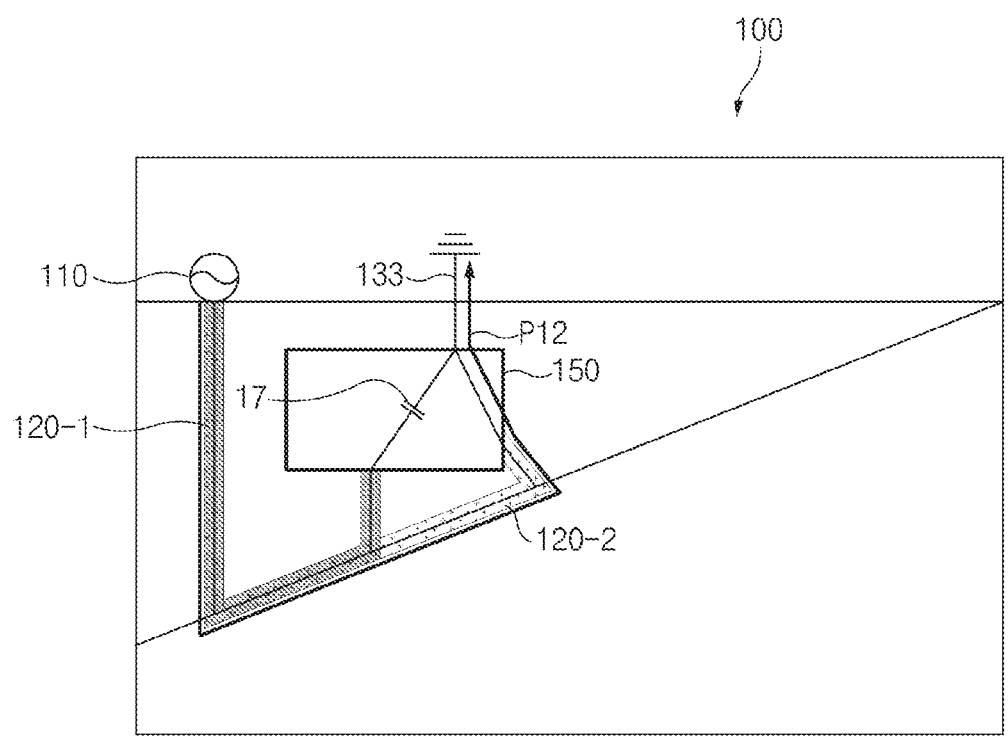

FIGS. 1A and 1B illustrate an example of an operation of an antenna system including a switching circuit.

Referring to FIG. 1A, an antenna system 100 may include a feeder unit 110, an antenna including a first radiator element 120-1 and a second radiator element 120-2, a ground line (or a ground unit) 133, and a switching circuit (or a switch) 150.

The switching circuit 150 may include a single pole, double throw (SPDT) switch. The switching circuit 150 may include a first port, a second port, and a third port. The first port may be connected with the ground line 133 that is connected with a ground region. The second port may be connected with the first radiator element 120-1 that operates in a first frequency band, and the third port may be connected with the second radiator element 120-2 that operates in a second frequency band.

When the antenna system 100 operates in the first frequency band, the switching circuit 150 may electrically connect the first radiator element 120-1 and the ground line 133. In this case, a signal supplied through the feeder unit 110 may flow through a path P11 including the first radiator element 120-1, the switching circuit 150, and the ground line 133. The second radiator element 120-2 may not be connected with the ground line 133, and thus, a first parasitic capacitor 13 may be formed between the first port and the third port within the switching circuit 150.

Referring to FIG. 1B, when the antenna system 100 operates in the second frequency band, the switching circuit 150 may electrically connect the second radiator element 120-2 and the ground line 133, and the first radiator element 120-1 may not be connected with the ground line 133. As such, a signal supplied through the feeder unit 110 may flow through a path P12 including the second radiator element 120-2, the switching circuit 150, and the ground line 133. In this case, a second parasitic capacitor 17 may be formed between the first port and the third port within the switching circuit 150.

Each of the parasitic capacitors 13 and 17 may have a very small capacitance value (e.g., 100 to 200 fF). Because impedance formed by each of the parasitic capacitors 13 and 17 is inversely proportional to a capacitance value, a voltage that is applied to the switching circuit 150 may increase as a capacitance value of each of the parasitic capacitors 13 and 17 decreases. Because the impedance formed by each of the parasitic capacitors 13 and 17 is inversely proportional to a frequency, a voltage that is applied to the switching circuit 150 may increase as the antenna system 100 operates in a low frequency (e.g., a second frequency band). When a voltage applied to the switching circuit 150 exceeds a maximum allowable voltage of the switching circuit 150 due to the parasitic capacitors 13 and 17, a portion, which exceeds the maximum allowable voltage, of a voltage waveform of a signal may be clipped. When the signal is clipped, a harmonics component may occur due to non-linearity of the signal, and the harmonics component may become problematic with regard to the radiated spurious emission (RSE) performance of an antenna.

Figure 2:
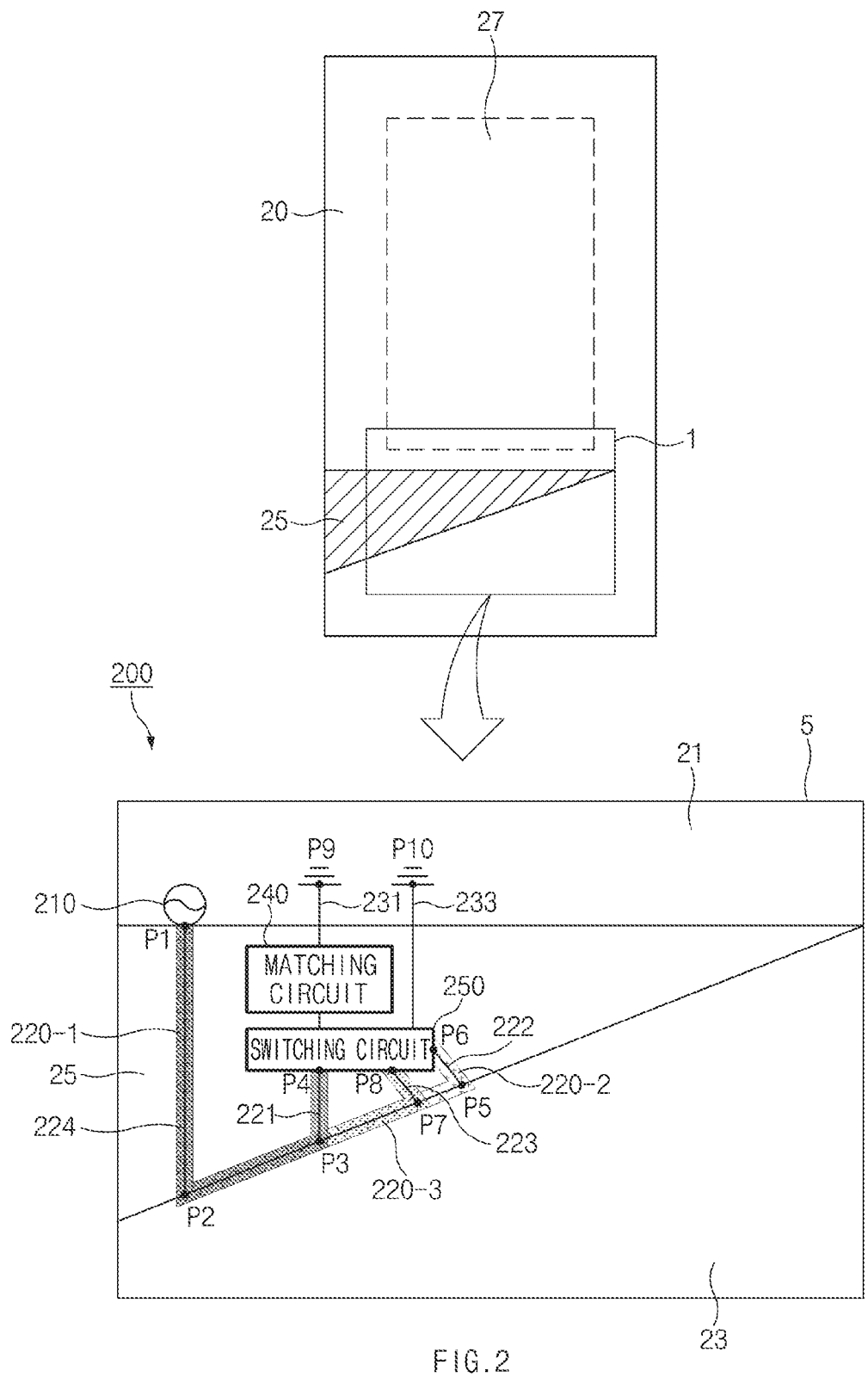
FIG. 2 is a view illustrating a structure of an antenna system according to various embodiments of the disclosure.

FIG. 2 is a view illustrating a structure of an antenna system according to various embodiments of the disclosure.

Figure 5:
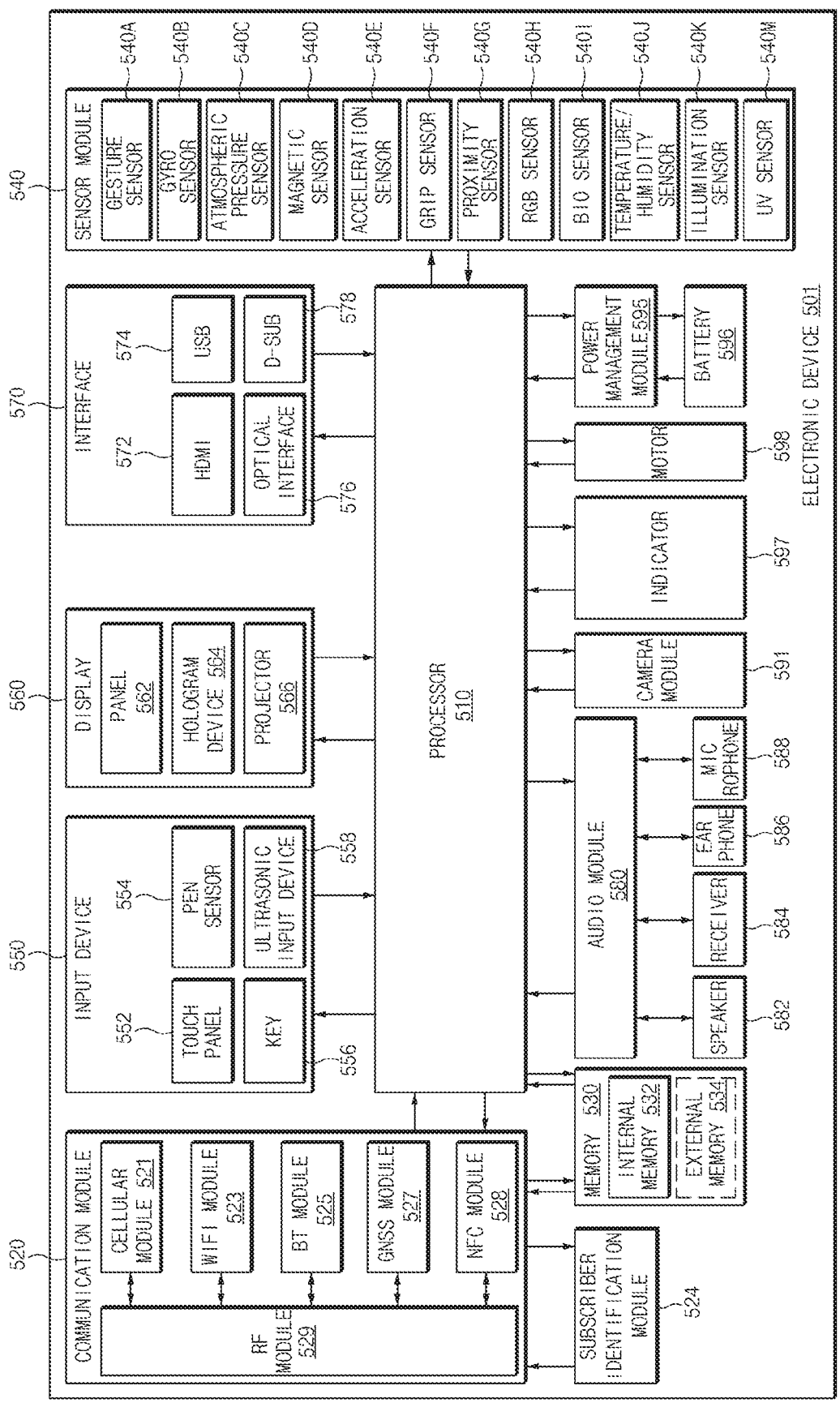
FIG. 5 is a block diagram of an electronic device according to various embodiments of the disclosure.

An antenna system (or an antenna device) 200 according to various embodiments of the disclosure may be implemented on a conductive plate 20 included in an electronic device (e.g., an electronic device 501 of FIG. 5). According to an embodiment, the conductive plate 20 may include a conductive material (e.g., metal) in at least a partial region thereof. The conductive plate 20 may be, for example, a printed circuit board (PCB). According to an embodiment, the conductive plate 20 may be disposed within a housing of the electronic device.

According to an embodiment, the conductive plate 20 may include a slit region 25. For example, the conductive plate 20 may include the slit region 25 of a triangular shape. According to an embodiment, the slit region 25 may include a non-conductive material (e.g., air or non-conductive polymer).

According to an embodiment, the conductive plate 20 may include a ground region (or a ground plate) 27. The ground region 27 may be, for example, a region corresponding to a ground plate. For example, the conductive plate 20 may include a plurality of layers, and the ground plate may be included in a part of the plurality of layers.

Referring to an enlarged image 5 in which a partial region 1 of the conductive plate 20 is enlarged, the antenna system 200 may include a feeder unit 210, an antenna including a plurality of radiator elements 220-1, 220-2, and 220-3, a plurality of ground lines (or a plurality of ground units) 231 and 233, a matching circuit 240, and a switching circuit (or a switch) 250.

According to an embodiment, the feeder unit 210 may supply a current (or a signal) to the antenna system (or antenna) 200. According to an embodiment, the feeder unit 210 may supply a current to a specific point of the conductive plate 20. For example, the feeder unit 210 may supply a current to a first point P1 included in a first region 21 of the conductive plate 20. When a power is supplied to the first point P1, a current may flow to a second point P2 that is included in a second region 23 of the conductive plate 20 through a fourth line 224 forming a portion of the plurality of radiator elements 220-1, 220-2, and 220-3. For another example, the feeder unit 210 may supply a current to the second point P2 included in the second region 23 of the conductive plate 20.

According to an embodiment, the plurality of radiator elements 220-1, 220-2, and 220-3 may operate at different frequencies. For example, the first radiator element 220-1 may operate in a first frequency band (e.g., ranging from 2200 MHz to 2600 MHz), the second radiator element 220-2 may operate in a second frequency band (e.g., ranging from 700 MHz to 1000 MHz), and the third radiator element 220-3 may operate in a third frequency band (e.g., ranging from 1700 MHz to 2100 MHz).

According to an embodiment, each of the plurality of radiator elements 220-1, 220-2, and 220-3 may be connected with the switching circuit 250. According to an embodiment, each of the plurality of radiator elements 220-1, 220-2, and 220-3 may include a line that is connected with the switching circuit 250. For example, the first radiator element 220-1 may include a first line 221 that connects a third point P3 of the second region 23 and a fourth point P4 of the switching circuit 250. For another example, the second radiator element 220-2 may include a second line 222 that connects a fifth point P5 of the second region 23 and a sixth point P6 of the switching circuit 150. For another example, the third radiator element 220-3 may include a third line 223 that connects a seventh point P7 of the second region 23 and an eighth point P8 of the switching circuit 250.

According to an embodiment, the plurality of radiator elements 220-1, 220-2, and 220-3 may have different electrical lengths. An electrical length of each of the plurality of radiator elements 220-1, 220-2, and 220-3 may correspond to a length from the first point P1, to which a power is supplied by the feeder unit 210, to each of the points P4, P6, and P8 that is connected with the switching circuit 250. For example, the electrical length of the first radiator element 220-1 may correspond to a length that starts from the first point P1, passes through the second point P2 and the third point P3, and ends at the fourth point P4 connected with the switching circuit 250. For another example, the electrical length of the second radiator element 220-2 may correspond to a length that starts from the first point P1, passes through the second point P2, the third point P3, the seventh point P7, and the fifth point P5, and ends at the sixth point P6 connected with the switching circuit 250. For another example, the electrical length of the third radiator element 220-3 may correspond to a length that starts from the first point P1, passes through the second point P2, the third point P3, and the seventh point P7, and ends at the eighth point P8, which is connected with the switching circuit 250.

According to an embodiment, operating frequencies of the plurality of radiator elements 220-1, 220-2, and 220-3 may be determined depending on the respective electrical lengths. For example, each of the plurality of radiator elements 220-1, 220-2, and 220-3 may operate in a relatively low frequency band as an electrical length increases and may operate in a relatively high frequency band as an electrical length decreases.

According to an embodiment, each of the plurality of radiator elements 220-1, 220-2, and 220-3 may include a portion overlapping any other radiator elements. For example, the first radiator element 220-1 and the second radiator element 220-2 may overlap each other in a portion that starts from the first point P1, passes through the second point P2, and ends at the third point P3. For another example, the second radiator element 220-2 and the third radiator element 220-3 may overlap each other in a portion that starts from the first point P1, passes through the second point P2 and the third point P3, and ends at the seventh point P7.

The antenna system 200 illustrated in FIG. 2 may include the three radiator elements 220-1, 220-2, and 220-3. However, according to various embodiments of the disclosure, a part (e.g., the third radiator element 220-3) of a plurality of radiator elements may be omitted, or at least another radiator element may be added.

According to an embodiment, the plurality of ground lines 231 and 233 may be connected with the ground region 27.

According to an embodiment, the plurality of ground lines 231 and 233 may be connected with the ground region 27 at different points. For example, the first ground line 231 may be connected with the ground region 27 through a ninth point P9 included in the first region 21 of the conductive plate 20. For another example, the second ground line 233 may be connected with the ground region 27 through a tenth point P10 included in the first region 21 of the conductive plate 20. According to another embodiment, the plurality of ground lines 231 and 233 may be connected with the ground region 27 at the same point. For example, the plurality of ground lines 231 and 233 may be connected with the ground region 27 through the ninth point P9 or the tenth point P10. According to an embodiment, the first ground line 231 may be connected with the matching circuit 240. According to an embodiment, the second ground line 233 may be connected with the switching circuit 250.

According to an embodiment, the matching circuit 240 may be disposed in the slit region 25 of the conductive plate 20. According to another embodiment, the matching circuit 240 may be disposed in the first region 21 of the conductive plate 20, which is adjacent to the slit region 25, or may be disposed to cover the slit region 25 and the first region 21. According to an embodiment, the matching circuit 240 may be interposed between the first ground line 231 and the switching circuit 250.

According to an embodiment, the matching circuit 240 may include at least one inductor. The inductance of the inductor may be set such that, when the antenna system 200 operates, a voltage applied to the switching circuit 250 is a maximum allowable voltage or lower of the switching circuit 250.

According to an embodiment, the switching circuit 250 may be disposed in the slit region 25 of the conductive plate 20. According to an embodiment, the switching circuit 250 may include a plurality of ports. The switching circuit 250 may be connected with the plurality of radiator elements 220-1, 220-2, and 220-3, the matching circuit 240, and the second ground line 233 through different ports.

According to an embodiment, depending on an operating frequency of the antenna 200, the switching circuit 250 may connect one of the plurality of radiator elements 220-1, 220-2, and 220-3 with the second ground line 233 and may connect the others with the matching circuit 240.

Figure 3A:
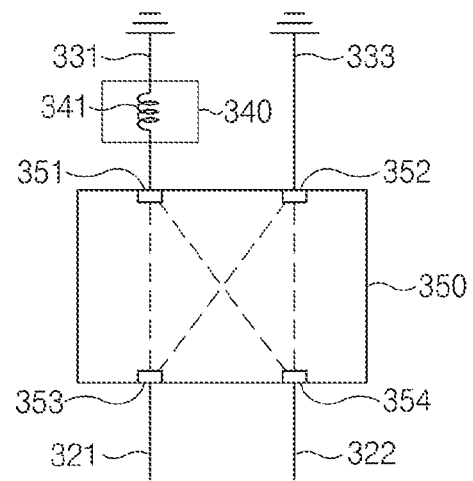
FIG. 3A illustrates an example of a switching circuit including a double pole, double throw (DPDT) switch.

FIG. 3A illustrates an example of a switching circuit including a double pole, double throw (DPDT) switch.

Referring to FIG. 3A, a switching circuit 350 (e.g., the switching circuit 250 of FIG. 2) may include a first port 351, a second port 352, a third port 353, and a fourth port 354. The first port 351 may be connected with a matching circuit 340 (e.g., the matching circuit 240 of FIG. 2) that is connected with a first ground line (or a first ground unit) 331 (e.g., the first ground line 231 of FIG. 2). The second port 352 may be connected with a second ground line (or a second ground unit) 333 (e.g., the second ground line 233 of FIG. 2). The first ground line 331 and the second ground line 333 may be connected with a ground region (e.g., the ground region 27 of FIG. 2). The third port 353 may be connected with a first line 321 included in a first radiator element (e.g., the first radiator element 220-1 of FIG. 2) that operates in the first frequency band, and the fourth port 354 may be connected with a second line 322 included in a second radiator element (e.g., the second radiator element 220-2 of FIG. 2) that operates in the second frequency band.

According to an embodiment, the switching circuit 350 may connect each of the third port 353 and the fourth port 354 with one of the first port 351 and the second port 352, depending on an operating frequency of an antenna. For example, when the antenna operates in the first frequency band, the switching circuit 350 may connect the first port 351 with the fourth port 354 and may connect the second port 352 with the third port 353. When the second port 352 and the third port 353, a signal may be transmitted/received through the first radiator element that operates in the first frequency band. For another example, when the antenna operates in the second frequency band, the switching circuit 350 may connect the first port 351 with the third port 353 and may connect the second port 352 with the fourth port 354. When the second port 352 and the fourth port 354, a signal may be transmitted/received through the second radiator element that operates in the second frequency band.

According to an embodiment, the DPDT switch illustrated in FIG. 3A may be implemented with a plurality of (e.g., two) single pole, double throw (SPDT) switches. For example, the switching circuit 350 may include a first SPDT switch connecting a first radiator element with a second ground line or a matching circuit and a second SPDT switch connecting a second radiator element with the second ground line or the matching circuit. According to an embodiment, the first SPDT switch may connect the first radiator element with the second ground line when an antenna operates in the first frequency band and may connect the first radiator element with the matching circuit when the antenna operates in the second frequency band. According to an embodiment, the second SPDT switch may connect the second radiator element with the matching circuit when the antenna operates in the first frequency band and may connect the second radiator element with the second ground line when the antenna operates in the second frequency band.

Figure 3B:
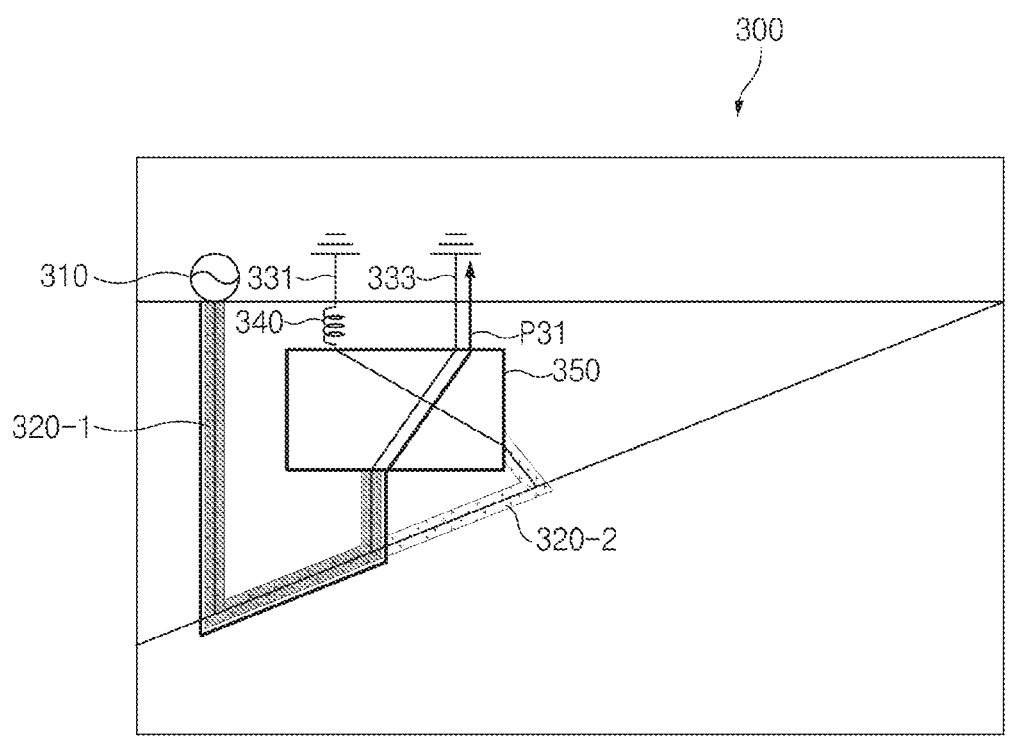
FIGS. 3B and 3C illustrate an example of an operation of an antenna including a switching circuit illustrated in FIG. 3A.
Figure 3C:
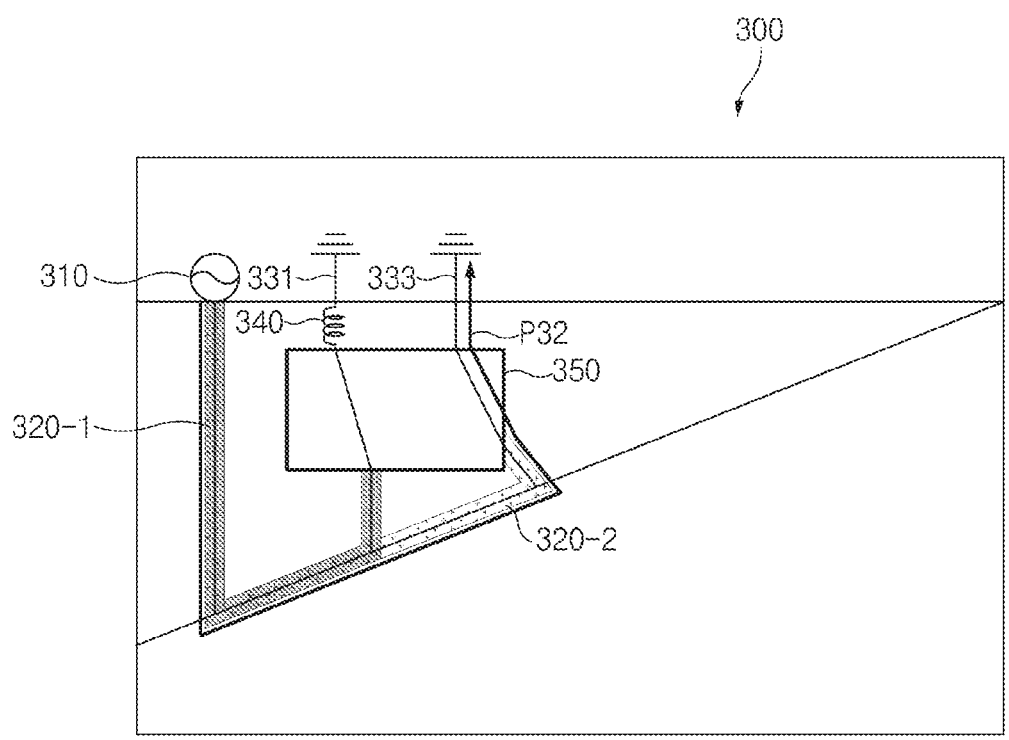

FIGS. 3B and 3C illustrate an example of an operation of an antenna including a switching circuit illustrated in FIG. 3A.

Referring to FIGS. 3B and 3C, an antenna 300 may include a feeder unit 310, a first radiator element 320-1, a second radiator element 320-2, the first ground line 331, the second ground line 333, the matching circuit 340, and the switching circuit 350.

According to an embodiment, the switching circuit 350 may include a double pole, double throw (DPDT) switch. The switching circuit 350 may include a first port, a second port, a third port, and a fourth port. The first port may be connected with the matching circuit 340 that is connected with the first ground line 331. The second port may be connected with the second ground line 333 that is connected with a ground region (e.g., the ground region 27 of FIG. 2). The third port may be connected with the first radiator element 320-1 that operates in the first frequency band, and the fourth port may be connected with the second radiator element 320-2 that operates in the second frequency band.

Referring to FIG. 3B, when the antenna 300 operates in the first frequency band, the switching circuit 350 may electrically connect the first radiator element 320-1 and the second ground line 333 and may electrically connect the second radiator element 320-2 and the matching circuit 340. When the first radiator element 320-1 and the second ground line 333 are connected, a signal supplied through the feeder unit 310 may flow through a path P31 including the first radiator element 320-1, the switching circuit 350, and the second ground line 333. When the second radiator element 320-2 and the matching circuit 340 are connected, there may be formed a path including the second radiator element 320-2, the switching circuit 350, the matching circuit 340, and the first ground line 331. The matching circuit 340 that includes an inductor may operate as an open circuit in an operating frequency (e.g., 2200 to 2600 MHz) of the first radiator element 320-1, thus having no influence on the performance of an antenna in the first frequency band.

Referring to FIG. 3C, when the antenna 300 operates in the second frequency band, the switching circuit 350 may electrically connect the first radiator element 320-1 and the matching circuit 340 and may electrically connect the second radiator element 320-2 and the second ground line 333. When the second radiator element 320-2 and the second ground line 333 are connected, a signal supplied through the feeder unit 310 may flow through a path P32 including the second radiator element 320-2, the switching circuit 350, and the second ground line 333. When the first radiator element 320-1 and the matching circuit 340 are connected, there may be formed a path including the first radiator element 320-1, the switching circuit 350, the matching circuit 340, and the first ground line 331. The matching circuit 340 that includes the inductor may operate as an open circuit in an operating frequency (e.g., 700 to 1000 MHz) of the second radiator element 320-2, thus having no influence on the performance of an antenna in the second frequency band.

According to an embodiment, the inductance of the inductor included in the matching circuit 340 may be set such that, when the antenna 300 operates, a voltage applied to the switching circuit 350 is a maximum allowable voltage or lower of the switching circuit 350. For example, the inductance of the inductor may be set to 82 to 100 nH. Because the impedance of the inductor included in the matching circuit 340 is proportional to an inductance value, as the inductance value of the inductor becomes greater, the voltage that is applied to the matching circuit 340 may increase, and the voltage that is applied to the switching circuit 350 may decrease. When the impedance of the inductor included in the matching circuit 340 has a sufficiently great value compared with the impedance by an internal resistance of the switching circuit 350 and a line inductance of the radiator element 320-1 or 320-2, the switching circuit 350 may operate at a voltage that is the maximum allowable voltage or lower. As such, the degradation of the RSE performance of an antenna due to a harmonics component may be prevented.

Figure 4A:
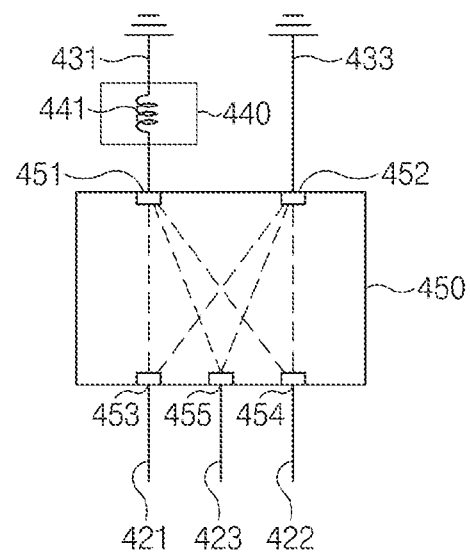
FIG. 4A illustrates an example of a switching circuit including a double pole, triple throw (DP3T) switch.

FIG. 4A illustrates an example of a switching circuit including a double pole, triple throw (DP3T) switch.

Referring to FIG. 4A, a switching circuit 450 (e.g., the switching circuit 250 of FIG. 2) may include a first port 451, a second port 452, a third port 453, a fourth port 454, and a fifth port 455. The first port 451 may be connected with a matching circuit 440 (e.g., the matching circuit 240 of FIG. 2) that is connected with a first ground line 431 (e.g., the first ground line 231 of FIG. 2). The second port 452 may be connected with a second ground line 433 (e.g., the second ground line 233 of FIG. 2). The first ground line 431 and the second ground line 433 may be connected with a ground region (e.g., the ground region 27 of FIG. 2). The third port 453 may be connected with a first line 421 included in a first radiator element (e.g., the first radiator element 220-1 of FIG. 2) that operates in the first frequency band. The fourth port 454 may be connected with a second line 422 included in a second radiator element (e.g., the second radiator element 220-2 of FIG. 2) that operates in the second frequency band. The fifth port 455 may be connected with a third line 423 included in a third radiator element (e.g., the third radiator element 220-3 of FIG. 3) that operates in the third frequency band.

According to an embodiment, the switching circuit 450 may connect each of the third, fourth, and fifth ports 453, 454, and 455 with one of the first port 451 and the second port 452, depending on an operating frequency of an antenna. For example, when the antenna operates in the first frequency band, the switching circuit 450 may connect the first port 451 with the fourth port 454 and the fifth port 455 and may connect the second port 452 with the third port 453. When the second port 452 and the third port 453, a signal may be transmitted/received through the first radiator element that operates in the first frequency band. For another example, when the antenna operates in the second frequency band, the switching circuit 450 may connect the first port 451 with the third port 453 and the fifth port 455 and may connect the second port 452 with the fourth port 454. When the second port 452 and the fourth port 454, a signal may be transmitted/received through the second radiator element that operates in the second frequency band. For another example, when the antenna operates in the third frequency band, the switching circuit 450 may connect the first port 451 with the third port 453 and the fourth port 454 and may connect the second port 452 with the fifth port 455. When the second port 452 and the fifth port 455, a signal may be transmitted/received through the third radiator element that operates in the third frequency band.

According to an embodiment, the DP3T switch illustrated in FIG. 3A may be implemented with a plurality of (e.g., three) single pole, double throw (SPDT) switches. For example, the switching circuit 450 may include a first SPDT switch connecting the first radiator element with a second ground line or a matching circuit, a second SPDT switch connecting the second radiator element with the second ground line or the matching circuit, and a third SPDT switch connecting the third radiator element with the second ground line or the matching circuit. According to an embodiment, the first SPDT switch may connect the first radiator element with the second ground line when an antenna operates in the first frequency band and may connect the first radiator element with the matching circuit when the antenna operates in the second frequency band. According to an embodiment, the second SPDT switch may connect the second radiator element with the matching circuit when the antenna operates in the first frequency band or the third frequency band and may connect the second radiator element with the second ground line when the antenna operates in the second frequency band. According to an embodiment, the third SPDT switch may connect the third radiator element with the matching circuit when the antenna operates in the first frequency band or the second frequency band and may connect the third radiator element with the second ground line when the antenna operates in the third frequency band.

Figure 4B:
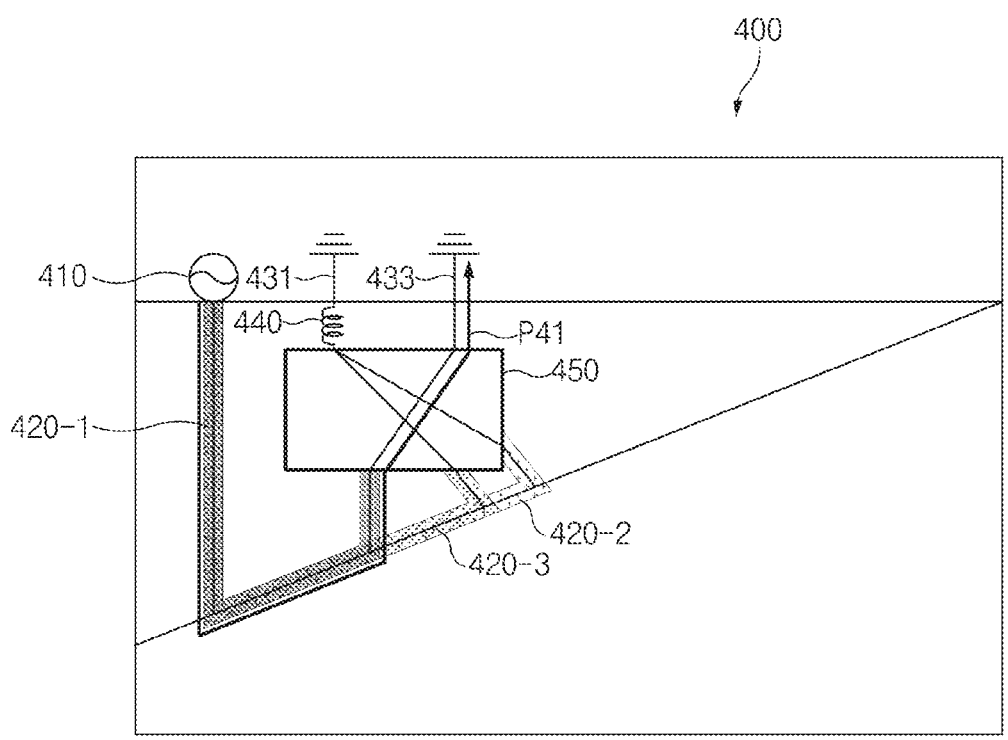
FIGS. 4B, 4C, and 4D illustrate an example of an operation of an antenna including a switching circuit illustrated in FIG. 4A.
Figure 4C:
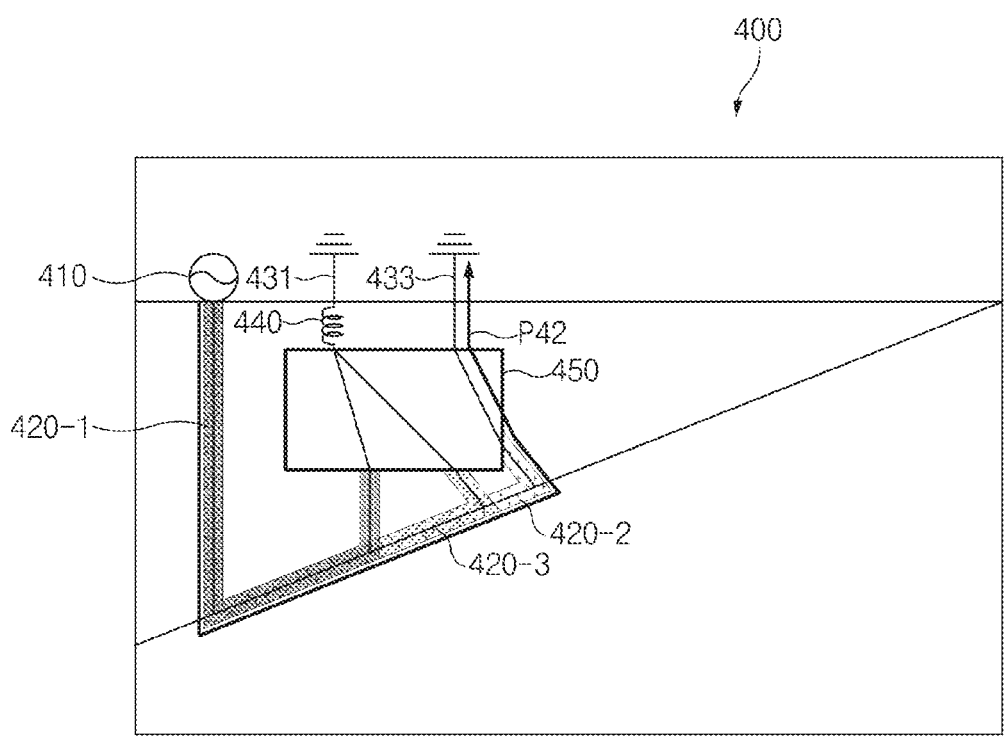
Figure 4D:
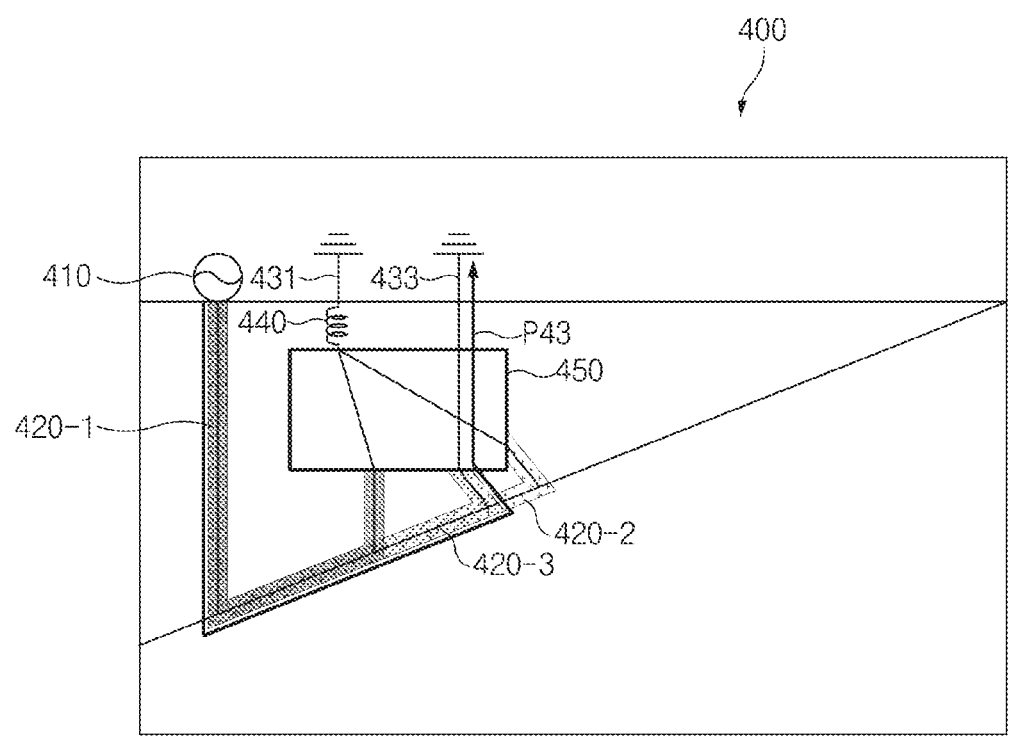

FIGS. 4B to 4D illustrate an example of an operation of an antenna including a switching circuit illustrated in FIG. 4A.

Referring to FIGS. 4B and 4C, an antenna 400 may include a feeder unit 410, a first radiator element 420-1, a second radiator element 420-2, a third radiator element 420-3, the first ground line 431, the second ground line 433, the matching circuit 440, and the switching circuit 450.

According to an embodiment, the switching circuit 450 (e.g., the switching circuit 250 of FIG. 2) may include a double pole, triple throw (DP3T) switch. The switching circuit 450 may include a first port, a second port, a third port, a fourth port, and a fifth port. The first port may be connected with the matching circuit 440 that is connected with the first ground line 431. The second port may be connected with the second ground line 433 that is connected with a ground region (e.g., the ground region 27 of FIG. 2). The third port may be connected with the first radiator element 420-1 that operates in the first frequency band, the fourth port may be connected with the second radiator element 420-2 that operates in the second frequency band, and the fifth port may be connected with the third radiator element 420-3 that operates in the third frequency band.

Referring to FIG. 4B, when the antenna 400 operates in the first frequency band, the switching circuit 450 may electrically connect the first radiator element 420-1 with the second ground line 433 and may electrically connect the second radiator element 420-2 and the third radiator element 420-3 with the matching circuit 440. When the first radiator element 420-1 and the second ground line 433 are connected, a signal supplied through the feeder unit 410 may flow through a path P41 including the first radiator element 420-1, the switching circuit 450, and the second ground line 433. When the second radiator element 420-2 and the matching circuit 440 are connected, there may be formed a path including the second radiator element 420-2, the switching circuit 450, the matching circuit 440, and the first ground line 431. When the third radiator element 420-3 and the matching circuit 440 are connected, there may be formed a path including the third radiator element 420-3, the switching circuit 450, the matching circuit 440, and the first ground line 431. The matching circuit 440 that includes an inductor may operate as an open circuit in an operating frequency (e.g., 2200 to 2600 MHz) of the first radiator element 420-1, thus having no influence on the performance of an antenna in the first frequency band.

Referring to FIG. 4C, when the antenna 400 operates in the second frequency band, the switching circuit 450 may electrically connect the second radiator element 420-2 with the second ground line 433 and may electrically connect the first radiator element 420-1 and the third radiator element 420-3 with the matching circuit 440. When the second radiator element 420-2 and the second ground line 433 are connected, a signal supplied through the feeder unit 410 may flow through a path P42 including the second radiator element 420-2, the switching circuit 450, and the second ground line 433. When the first radiator element 420-1 and the matching circuit 440 are connected, there may be formed a path including the first radiator element 420-1, the switching circuit 450, the matching circuit 440, and the first ground line 431. When the third radiator element 420-3 and the matching circuit 440 are connected, there may be formed a path including the third radiator element 420-3, the switching circuit 450, the matching circuit 440, and the first ground line 431. The matching circuit 440 that includes the inductor may operate as an open circuit in an operating frequency (e.g., 700 to 1000 MHz) of the second radiator element 420-2, thus having no influence on the performance of an antenna in the second frequency band.

Referring to FIG. 4D, when the antenna 400 operates in the third frequency band, the switching circuit 450 may electrically connect the third radiator element 420-3 with the second ground line 433 and may electrically connect the first radiator element 420-1 and the second radiator element 420-2 with the matching circuit 440. When the third radiator element 420-3 and the second ground line 433 are connected, a signal supplied through the feeder unit 410 may flow through a path P43 including the second radiator element 420-1, the switching circuit 450, and the second ground line 433. When the first radiator element 420-1 and the matching circuit 440 are connected, there may be formed a path including the first radiator element 420-1, the switching circuit 450, the matching circuit 440, and the first ground line 431. When the second radiator element 420-2 and the matching circuit 440 are connected, there may be formed a path including the second radiator element 420-2, the switching circuit 450, the matching circuit 440, and the first ground line 431. The matching circuit 440 that includes the inductor may operate as an open circuit in an operating frequency (e.g., 1700 to 2100 MHz) of the third radiator element 420-3, thus having no influence on the performance of an antenna in the third frequency band.

According to an embodiment, the inductance of the inductor included in the matching circuit 440 may be set such that, when the antenna 400 operates, a voltage applied to the switching circuit 450 is a maximum allowable voltage or lower of the switching circuit 450. For example, the inductance of the inductor may be set to 82 to 100 nH. Because the impedance of the inductor included in the matching circuit 440 is proportional to an inductance value, as the inductance value of the inductor becomes greater, the voltage that is applied to the matching circuit 440 may increase, and the voltage that is applied to the switching circuit 450 may decrease. When the impedance of the inductor included in the matching circuit 440 has a sufficiently great value compared with the impedance by an internal resistance of the switching circuit 450 and a line inductance of the radiator element 420-1, 420-2, or 420-3, the switching circuit 450 may operate at a voltage that is a maximum allowable voltage or lower. As such, the degradation of the RSE performance of an antenna due to a harmonics component may be prevented.

An antenna including two or three radiator elements is described with reference to FIGS. 3A to 4D. However, according to various embodiments of the disclosure, the antenna may include four or more radiator elements operating in different frequency bands. In the case where the antenna includes four or more radiator elements, a switching circuit included in the antenna may include a DTxT switch (x being the number of radiator elements).

FIG. 5 illustrates a block diagram of an electronic device, according to various embodiments of the disclosure.

The electronic device 501 may include one or more processors (e.g., an application processor (AP)) 510, a communication module 520, a subscriber identification module 524, a memory 530, a sensor module 540, an input device 550, a display 560, an interface 570, an audio module 580, a camera module 591, a power management module 595, a battery 596, an indicator 597, and a motor 598. The processor 510 may drive, for example, an operating system (OS) or an application to control a plurality of hardware or software components connected to the processor 510 and may process and compute a variety of data. For example, the processor 510 may be implemented with a System on Chip (SoC). According to an embodiment, the processor 510 may further include a graphic processing unit (GPU) and/or an image signal processor. The processor 510 may include at least a part (e.g., a cellular module 521) of components illustrated in FIG. 5. The processor 510 may load a command or data, which is received from at least one of other components (e.g., a nonvolatile memory), into a volatile memory and process the loaded instruction or data. The processor 510 may store result data in the nonvolatile memory.

The communication module 520 may include the cellular module 521, a Wi-Fi module 523, a Bluetooth (BT) module 525, a GNSS module 527, a near field communication (NFC) module 528, and a radio frequency (RF) module 529. The cellular module 521 may provide, for example, voice communication, video communication, a character service, an Internet service, or the like over a communication network. According to an embodiment, the cellular module 521 may perform discrimination and authentication of the electronic device 501 within a communication network by using the subscriber identification module (e.g., a SIM card) 524. According to an embodiment, the cellular module 521 may perform at least a portion of functions that the processor 510 provides. According to an embodiment, the cellular module 521 may include a communication processor (CP). According to an embodiment, at least a part (e.g., two or more) of the cellular module 521, the Wi-Fi module 523, the BT module 525, the GNSS module 527, or the NFC module 528 may be included within one Integrated Circuit (IC) or an IC package. For example, the RF module 529 may transmit and receive a communication signal (e.g., an RF signal). For example, the RF module 529 may include a transceiver, a power amplifier module (PAM), a frequency filter, a low noise amplifier (LNA), an antenna (e.g., the antenna 200 of FIG. 2), or the like. According to another embodiment, at least one of the cellular module 521, the Wi-Fi module 523, the BT module 525, the GNSS module 527, or the NFC module 528 may transmit and receive an RF signal through a separate RF module. The subscriber identification module 524 may include, for example, a card and/or embedded SIM that includes a subscriber identification module and may include unique identify information (e.g., integrated circuit card identifier (ICCID)) or subscriber information (e.g., international mobile subscriber identity (IMSI)).

According to an embodiment, the processor (e.g., AP) 510 or the communication module (e.g., CP) 520 may control a switching circuit included in an antenna. For example, the processor (e.g., AP) 510 or the communication module (e.g., CP) 520 may control connection states of a plurality of ports included in the switching circuit such that the antenna operates in a specified frequency band.

The memory 530 may include an internal memory 532 or an external memory 534. For example, the internal memory 532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 534 may include a flash drive such as compact flash (CF), secure digital (SD), micro secure digital (Micro-SD), mini secure digital (Mini-SD), extreme digital (xD), a multimedia card (MMC), a memory stick, or the like. The external memory 534 may be operatively and/or physically connected to the electronic device 501 through various interfaces.

The sensor module 540 may measure, for example, a physical quantity or may detect an operation state of the electronic device 501. The sensor module 540 may convert the measured or detected information to an electric signal. For example, the sensor module 540 may include at least one of a gesture sensor 540A, a gyro sensor 540B, a barometric pressure sensor 540C, a magnetic sensor 540D, an acceleration sensor 540E, a grip sensor 540F, the proximity sensor 540G, a color sensor 540H (e.g., red, green, blue (RGB) sensor), a biometric sensor 540I, a temperature/humidity sensor 540J, an illuminance sensor 540K, or an UV sensor 540M. Although not illustrated, additionally or alternatively, the sensor module 540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 540 may further include a control circuit for controlling at least one or more sensors included therein. According to an embodiment, the electronic device 501 may further include a processor that is a part of the processor 510 or independent of the processor 510 and is configured to control the sensor module 540. The processor may control the sensor module 540 while the processor 510 remains at a sleep state.

The input device 550 may include, for example, a touch panel 552, a (digital) pen sensor 554, a key 556, or an ultrasonic input unit 558. For example, the touch panel 552 may use at least one of capacitive, resistive, infrared and ultrasonic detecting methods. Also, the touch panel 552 may further include a control circuit. The touch panel 552 may further include a tactile layer to provide a tactile reaction to a user. The (digital) pen sensor 554 may be, for example, a part of a touch panel or may include an additional sheet for recognition. The key 556 may include, for example, a physical button, an optical key, or a keypad. The ultrasonic input device 558 may detect (or sense) an ultrasonic signal, which is generated from an input device, through a microphone (e.g., a microphone 588) and may check data corresponding to the detected ultrasonic signal.

The display 560 may include a panel 562, a hologram device 564, a projector 566, and/or a control circuit for controlling the panel 562, the hologram device 564, or the projector 566. The panel 562 may be implemented, for example, to be flexible, transparent or wearable. The panel 562 and the touch panel 552 may be integrated into a single module. According to an embodiment, the panel 562 may include a pressure sensor (or force sensor) that measures the intensity of touch pressure by a user. The pressure sensor may be implemented integrally with the touch panel 552, or may be implemented as at least one sensor separately from the touch panel 552. The hologram device 564 may display a stereoscopic image in a space using a light interference phenomenon. The projector 566 may project light onto a screen so as to display an image. For example, the screen may be arranged in the inside or the outside of the electronic device 501. The interface 570 may include, for example, a high-definition multimedia interface (HDMI) 572, a universal serial bus (USB) 574, an optical interface 576, or a D-subminiature (D-sub) 578. Additionally or alternatively, the interface 570 may include, for example, a mobile high definition link (MHL) interface, a SD card/multi-media card (MMC) interface, or an infrared data association (IrDA) standard interface.

The audio module 580 may convert a sound and an electric signal in dual directions. The audio module 580 may process, for example, sound information that is input or output through a speaker 582, a receiver 584, an earphone 586, or the microphone 588. For example, the camera module 591 may shoot a still image or a video. According to an embodiment, the camera module 591 may include at least one or more image sensors (e.g., a front sensor or a rear sensor), a lens, an image signal processor (ISP), or a flash (e.g., an LED or a xenon lamp). The power management module 595 may manage, for example, power of the electronic device 501. According to an embodiment, a power management integrated circuit (PMIC), a charger IC, or a battery or fuel gauge may be included in the power management module 595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 596 and a voltage, current or temperature thereof while the battery is charged. The battery 596 may include, for example, a rechargeable battery and/or a solar battery.

The indicator 597 may display a specific state of the electronic device 501 or a part thereof (e.g., the processor 510), such as a booting state, a message state, a charging state, and the like. The motor 598 may convert an electrical signal into a mechanical vibration and may generate the following effects: vibration, haptic, and the like. The electronic device 501 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned components of the electronic device according to various embodiments of the disclosure may be configured with one or more components, and the names of the components may be changed according to the type of the electronic device. In various embodiments, some components of the electronic device (e.g., the electronic device 501) may be omitted or other additional components may be added. Furthermore, some of the components of the electronic device may be combined with each other so as to form one entity, so that the functions of the components may be performed in the same manner as before the combination.

[77] The term "module" used in this disclosure may include a unit composed of hardware, software and firmware and may be interchangeably used with the terms "unit", "logic", "logical block", "part" and "circuit". The "module" may be an integrated part or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. Operations performed by a module, a program module, or other components according to various embodiments may be executed sequentially, in parallel, repeatedly, or in a heuristic method or some operations may be executed in different sequences or may be omitted. Alternatively, other operations may be added.

The invention claimed is:

1. An antenna system comprising:
an antenna comprising a first radiator element operating in a first frequency band and a second radiator element operating in a second frequency band;
a feeder unit connected to the antenna;
a first ground unit;
a second ground unit;
a matching circuit connected to the first ground unit; and
a switch, wherein the switch is configured to:
connect the first radiator element with the second ground unit and connect the second radiator element with the matching circuit, when the antenna transmits or receives a signal through the first frequency band; and
connect the second radiator element with the second ground unit and connect the first radiator element to the matching circuit, when the antenna transmits or receives a signal through the second frequency band.

2. The antenna system of claim 1, wherein the matching circuit includes at least one inductor, and
wherein an inductance of the inductor is set such that a voltage applied to the switch is a maximum allowable voltage or lower of the switch.

3. The antenna system of claim 1, wherein the switch includes a double pole, double throw (DPDT) switch, and
wherein the switch includes:
a first port connected with the matching circuit;
a second port connected with the second ground unit;
a third port connected with the first radiator element; and
a fourth port connected with the second radiator element.

4. The antenna system of claim 3, wherein the switch is configured to:
connect the first port with the fourth port and connect the second port with the third port, when the antenna transmits or receives a signal through the first frequency band.

5. The antenna system of claim 3, wherein the switch is configured to:
connect the first port with the third port and connect the second port with the fourth port, when the antenna transmits or receives a signal through the second frequency band.

6. The antenna system of claim 1, wherein the antenna further includes:
a third radiator element operating in a third frequency band, and
wherein the switch includes a double pole, triple throw (DP3T) switch.

7. The antenna system of claim 6, wherein the switch includes:
a first port connected with the matching circuit;
a second port connected with the second ground unit;
a third port connected with the first radiator element;
a fourth port connected with the second radiator element; and
a fifth port connected with the third radiator element.

8. The antenna system of claim 7, wherein the switch is configured to:
connect the second port with the fifth port and connect the first port with the third port and the fourth port, when the antenna transmits or receives a signal through the third frequency band.

9. The antenna system of claim 1, wherein the switch includes:
a first single pole, double throw (SPDT) switch configured to connect the first radiator element with the second ground unit or the matching circuit; and
a second SPDT switch configured to connect the second radiator element with the second ground unit or the matching circuit,
wherein the first SPDT switch connects the first radiator element with the second ground unit when the antenna transmits or receives a signal through the first frequency band and connects the first radiator element with the matching circuit when the antenna transmits or receives a signal through the second frequency band, and
wherein the second SPDT switch connects the second radiator element with the matching circuit when the antenna transmits or receives a signal through the first frequency band and connects the second radiator element with the second ground unit when the antenna transmits or receives a signal through the second frequency band.

10. An electronic device comprising:
a housing:
a printed circuit board disposed within the housing and including a ground region; and
a wireless communication circuit disposed within the housing, wherein the printed circuit board includes:
an antenna including a first radiator element operating in a first frequency band and a second radiator element operating in a second frequency band, wherein the first radiator element and the second radiator element;
a first ground unit connected with the ground region;
a second ground unit connected with the ground region;
a matching circuit connected with the first ground unit; and
a switch, and
wherein the wireless communication circuit allows the switch to:
connect the first radiator element with the second ground unit and connect the second radiator element with the matching circuit, when a signal is transmitted or received through the first frequency band; and
connect the second radiator element with the second ground unit and connect the first radiator element with the matching circuit, when a signal is transmitted or received through the second frequency band.

11. The electronic device of claim 10, wherein the printed circuit board includes a slit region including a non-conductive material, and
wherein the switch and the matching circuit are disposed in the slit region.

12. The electronic device of claim 10, wherein the matching circuit includes at least one inductor, and
wherein an inductance of the inductor is set such that a voltage applied to the switch is a maximum allowable voltage or lower of the switch.

13. The electronic device of claim 10, wherein the switch includes:
a first port connected with the ground region through the matching circuit;
a second port connected with the ground region;
a third port connected with the first radiator element; and
a fourth port connected with the second radiator element, and
wherein the wireless communication circuit allows the switch to:
connect the first port with the fourth port and connect the second port with the third port, when a signal is transmitted or received through the first frequency band; and
connect the first port with the third port and connect the second port with the fourth port, when a signal is transmitted or received through the second frequency band.

14. The electronic device of claim 10, wherein the antenna further includes:
a third radiator element operating in a third frequency band, and
wherein the wireless communication circuit allows the switch to:
connect the first radiator element with the second ground unit and connect the second radiator element and the third radiator element with the matching circuit, when a signal is transmitted or received through the first frequency band;
connect the second radiator element with the second ground unit and connect the first radiator element and the third radiator element with the matching circuit, when a signal is transmitted or received through the second frequency band; and
connect the third radiator element with the second ground unit and connect the first radiator element and the second radiator element with the matching circuit, when a signal is transmitted or received through the third frequency band.

15. The electronic device of claim 14, wherein the switch includes:
a first port connected with the ground region through the matching circuit;
a second port connected with the ground region;
a third port connected with the first radiator element;
a fourth port connected with the second radiator element; and
a fourth port connected with the third radiator element, and
wherein the wireless communication circuit allows the switch to:
connect the first port with the fourth port and the fifth port and connect the second port with the third port, when a signal is transmitted or received through the first frequency band;
connect the first port with the third port and the fifth port and connect the second port with the fourth port, when a signal is transmitted or received through the second frequency band; and
connect the first port with the third port and the fourth port and connect the second port with the fifth port, when a signal is transmitted or received through the second frequency band.

* * * * *